(12) United States Patent
Prakash et al.

(10) Patent No.: US 11,381,601 B2
(45) Date of Patent: Jul. 5, 2022

(54) CUSTOMIZABLE DYNAMIC GRAPHQL API MANAGEMENT PLATFORM

(71) Applicant: International Business Machines Corporation, Armonk, NY (US)

(72) Inventors: Krithika Prakash, West Windsor, NJ (US); Moshe Morris Emanuel Matsa, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 16/743,192

(22) Filed: Jan. 15, 2020

(65) Prior Publication Data

US 2021/0218773 A1  Jul. 15, 2021

(51) Int. Cl.
*H04L 9/40* (2022.01)
*H04L 67/01* (2022.01)
*H04L 12/66* (2006.01)

(52) U.S. Cl.
CPC .............. *H04L 63/20* (2013.01); *H04L 12/66* (2013.01); *H04L 63/08* (2013.01); *H04L 67/42* (2013.01)

(58) Field of Classification Search
CPC ......... H04L 63/20; H04L 12/66; H04L 63/08; H04L 67/42
See application file for complete search history.

(56) References Cited

U.S. PATENT DOCUMENTS

| | | | |
|---|---|---|---|
| 9,646,028 B2 | 5/2017 | Schrock et al. | |
| 9,753,744 B1 | 9/2017 | Wells et al. | |
| 2017/0344605 A1 | 11/2017 | Wells et al. | |
| 2019/0065500 A1* | 2/2019 | Martin | G06F 16/951 |
| 2019/0196890 A1* | 6/2019 | Bucchi | G06F 16/951 |
| 2019/0340287 A1* | 11/2019 | Tamjidi | G06F 16/9024 |
| 2020/0125468 A1* | 4/2020 | Peddibhotla | G06F 21/604 |
| 2020/0314066 A1* | 10/2020 | Cruz Farmer | H04L 63/0263 |

FOREIGN PATENT DOCUMENTS

CN  107817996 B1  4/2019

OTHER PUBLICATIONS

YouTube Video (screenshots): "API Assembly in IBM API Management Beta 1"; Dec. 22, 2015; https://www.youtube.com/watch?v=N3geyccgW9I; 21 pages.

* cited by examiner

*Primary Examiner* — Minh Chau Nguyen
(74) *Attorney, Agent, or Firm* — Yee & Associates, P.C.

(57) ABSTRACT

Application programming interface (API) management is provided. The API management comprises defining a number of GraphQL policies and integrating the GraphQL policies into an API assembly, wherein the GraphQL policies number among other API policies at an API gateway. When a query is received from a client, the GraphQL policies are enforced on the query at the API gateway, and the query is modified if it does not comply with the GraphQL policies. The query is then sent to a GraphQL backend server. A response to the query is received from the GraphQL backend server, and the GraphQL policies are enforced on the response at the API gateway, and the response is modified if it does not comply with the GraphQL policies. The response is then sent to the client.

20 Claims, 5 Drawing Sheets

CUSTOMIZABLE DYNAMIC GRAPHQL API MANAGEMENT PLATFORM

BACKGROUND

The disclosure relates generally to application programming interface (API) management, and more specifically to providing a customizable and dynamic GraphQL API management platform.

An API is a set of routines, protocols, and tools for building software applications. An API makes it easier to develop a software application by providing all the basic building blocks. A developer then puts the building blocks together to create the software application. In essence, an application's API defines the proper way for the developer to request services from that application. APIs guarantee that all applications using a common API will have similar interfaces. For Simple Object Access Protocol (SOAP) and Representational State Transfer (REST) services, an API comes as a specification of remote calls exposed to the API consumers.

APIs can be used for accessing a Web-based software service or a Web tool. Using APIs, applications are able to talk to each other without any user knowledge or intervention. For example, when making a purchase online, the merchant website uses an API to send the credit card information to a remote application that verifies whether the credit card information is correct. Once payment is confirmed, the remote application sends a response back to the merchant site indicating that the merchant may complete the sale to the user. The user only sees the merchant website interface. Behind the scenes many applications are working together using APIs to provide the service.

API management is the process of creating and publishing APIs, enforcing their policies and controlling access. API management typically employs a gateway, which is a front-end server that receives API requests from clients, enforces throttling and security policies before sending the requests to the back-end servers, and then returns responses back to the clients.

GraphQL is an open-source data query language for APIs and acts as a server-side runtime for fulfilling queries for existing data by using a type system to define data. GraphQL supports reading, writing, and subscribing to real-time updates to data. GraphQL allows clients to define a required structure for data and have the server return the exact same requested structure. In contrast to REST, GraphQL is more flexible and avoids the problem of overfetching and underfetching data in response to queries.

SUMMARY

An illustrative embodiment provides a computer-implemented method for application programming interface (API) management. The API management comprises defining a number of GraphQL policies and integrating the GraphQL policies into an API assembly, wherein the GraphQL policies number among other API policies at an API gateway. When a query is received from a client, the GraphQL policies are enforced on the query at the API gateway, and the query is modified if it does not comply with the GraphQL policies. The query is then sent to a GraphQL backend server. A response to the query is received from the GraphQL backend server, and the GraphQL policies are enforced on the response at the API gateway, and the response is modified if it does not comply with the GraphQL policies. The response is then sent to the client.

Another illustrative embodiment provides a computer program product for API management. The computer program product comprises a non-volatile computer readable storage medium having program instructions embodied therewith, the program instructions executable by a number of processors to cause the computer to perform the steps of: defining a number of GraphQL policies; integrating the GraphQL policies into an API assembly, wherein the GraphQL policies number among other API policies at an API gateway; receiving a query from a client; enforcing the GraphQL policies on the query at the API gateway and modifying the query if it does not comply with the GraphQL policies; sending the query to a GraphQL backend server; receiving from the GraphQL backend server a response to the query; enforcing the GraphQL policies on the response at the API gateway and modifying the response if it does not comply with the GraphQL policies; and sending the response to the client.

Another illustrative embodiment provides a system for API management. The system comprises a bus system; a storage device connected to the bus system, wherein the storage device stores program instructions; and a number of processors connected to the bus system, wherein the number of processors execute the program instructions to: define a number of GraphQL policies; integrate the GraphQL policies into an API assembly, wherein the GraphQL policies number among other API policies at an API gateway; receive a query from a client; enforce the GraphQL policies on the query at the API gateway and modifying the query if it does not comply with the GraphQL policies; send the query to a GraphQL backend server; receive from the GraphQL backend server a response to the query; enforce the GraphQL policies on the response at the API gateway and modifying the response if it does not comply with the GraphQL policies; and send the response to the client.

DETAILED DESCRIPTION

Figure 1:
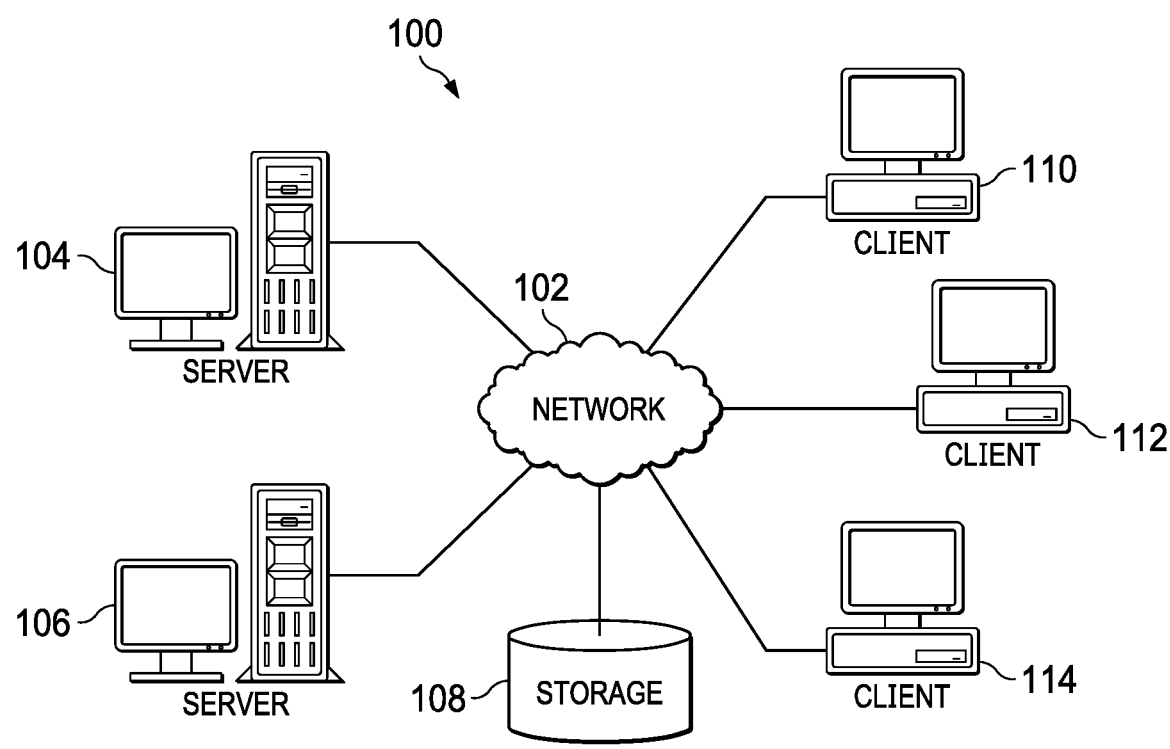
FIG. 1 depicts a pictorial representation of a network of data processing systems in which illustrative embodiments can be implemented.

The illustrative embodiments recognize and take into account one or more different considerations. Illustrative embodiments recognize and take into account that current API management platforms do not have deep API GraphQL Management capabilities. Many companies and service providers have created their own GraphQL endpoints, but they are not the providers of the API management platforms.

Illustrative embodiments recognize and take into account that GraphQL endpoint providers need to protect their APIs from malicious requests that could result in excessive computational loads and response sizes. For REST(-like) API, gateways and API management platforms allow users to define rate limits for queries, enforce authentication, and block clients that attempt to misuse the API. However, for GraphQL APIs there are no such solutions.

Illustrative embodiments recognize and take into account that existing solutions for GraphQL API management are either standalone modules or independent layers that do not offer all of the capabilities of an API gateway in an API creation and management lifecycle. Existing solutions do not allow for offloading of security injection into queries to the API gateway and do not support rate limit configuration at the REST API level and rate limiting based on GraphQL API query characteristics. Existing solutions also do not have a configurable GraphQL policy that is customizable.

Illustrative embodiments provide a GraphQL API management solution that is customizable, modular, and dynamic. A GraphQL policy is implemented in an API gateway as part of the API assembly. This GraphQL policy can be customized to any customer environment to expose existing REST endpoints as GraphQL API endpoints. The GraphQL policy can be context driven, making use of runtime variables for input and output in each step of handling GraphQL queries (e.g., parsing, validating, extracting characteristics) such that each step can be customized dynamically. For example, incoming queries can be redacted or injected with additional security information. Custom call outs can be performed across internal or external networks for additional validation and scope checks. Rate limits can be overridden dynamically on a per query/per key basis.

By integrating GraphQL capabilities into API management, illustrative embodiments enable the injection of security into a query based on authenticated identity before sending the query to the backend GraphQL server or based on a different identity trusted by the backend GraphQL server. Rate limits can be enforced at both the API level and the GraphQL level and allow either to override the other. Threat protection can be based on statistics about GraphQL queries and results. Both GraphQL queries and GraphQL results can be redacted, and both queries and results can be transformed for GraphQL.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

FIG. 1 depicts a pictorial representation of a network of data processing systems in which illustrative embodiments can be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide a set of one or more connector services for managing idempotent operations on a system of record, such as storage 108. An idempotent operation is an identical operation, which was previously performed or executed, that has the same effect as performing a single operation. Also, it should be noted that server 104 and server 106 may each represent a plurality of servers providing management of idempotent operations for a plurality of system of records.

Client 110, client 112, and client 114 also connect to network 102. Clients 110, 112, and 114 are clients of server 104 and server 106. Server 104 and server 106 may provide information, such as boot files, operating system images, and software applications to clients 110, 112, and 114.

In this example, clients 110, 112, and 114 are shown as desktop or personal computers. However, it should be noted that clients 110, 112, and 114 are intended as examples only. In other words, clients 110, 112, and 114 may include other types of data processing systems, such as, for example, network computers, laptop computers, tablet computers, handheld computers, smart phones, smart watches, personal digital assistants, gaming devices, set-top boxes, kiosks, smart tags, IoT sensors, and the like. Users of clients 110, 112, and 114 may utilize clients 110, 112, and 114 to access systems of record corresponding to one or more enterprises, via the connector services provided by server 104 and server 106, to perform different data operations. The operations may be, for example, retrieve data, update data, delete data, store data, and the like, on the systems of record.

Storage 108 is a network storage device capable of storing any type of data in a structured format or an unstructured format. In addition, storage 108 may represent a plurality of network storage devices. Further, storage 108 may represent a system of record, which is an authoritative data source, corresponding to an enterprise, organization, institution, agency, or similar entity. Furthermore, storage unit 108 may store other types of data, such as authentication or credential data that may include user names, passwords, and biometric data associated with client users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
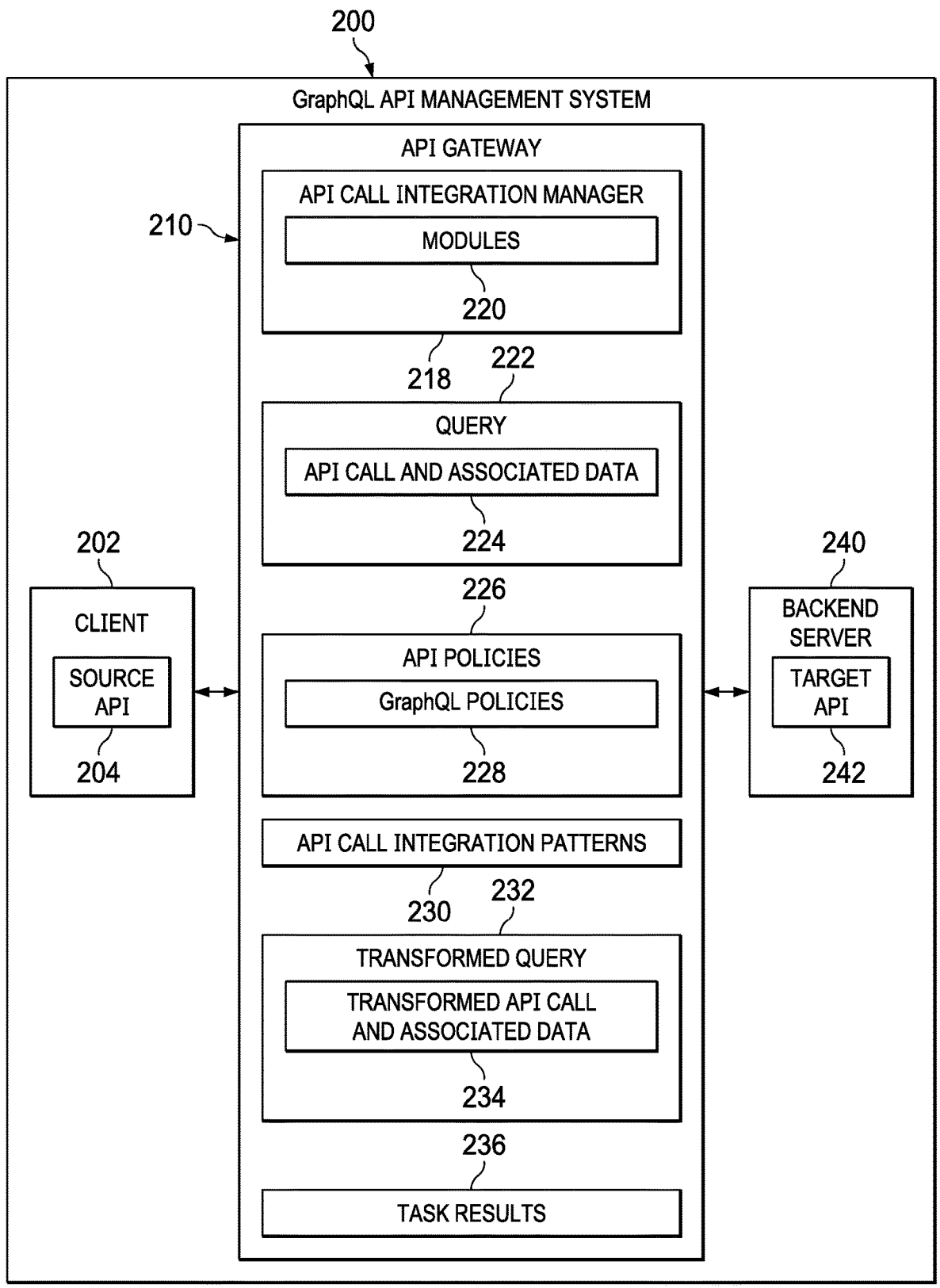
FIG. 2 illustrates a block diagram of a system for GraphQL API management in accordance with an illustrative embodiment.

FIG. 2 illustrates a block diagram of a system for GraphQL API management in accordance with an illustrative embodiment. GraphQL API management system 200 can be implemented using the network elements shown in FIG. 1. For example, API Gateway 210 might comprise a server such as server 106. Similarly, client 202 might comprise network client devices, such as client 110, communicating over a network such as network 102. Backend server 240 might comprise a server, such as server 104, that receives services requests from client devices, such as clients 110, 112, 114 through the API gateway 210.

In this example, API gateway 210 comprises API call integration manager 218. API call integration manager 218 controls the process of transforming API calls from client 202 into API calls that backend server 240 can utilize to perform the functions corresponding to service requests. This transformation is performed using API call integration pattern code corresponding to the same or similar API calls. API call integration manager 218 includes modules 220. Modules 220 represent a plurality of software modules that perform different processes during the transformation and integration of API calls. Modules 220 can include, for example, an API call listener module, an API call parser module, an API call and integration pattern search engine module, an API discovery engine module, an API call transformer module, and a transformed API call sender module. However, it should be noted that modules 220 can include any type of software module necessary for transforming integrating application programming interface calls.

API gateway 210 receives query 222 from a source computer, such as client 202. A user of the source computer may manually send query 222. Alternatively, a source API 204 corresponding to a service provided by the client 202 might automatically send query 222. Query 222 represents a call for a target API 242 located on a target computer, such as backend server 240, to perform a service function. Query 222 includes API call and associated data 224.

In processing query 222, modules 220 apply API policies 226 to query 222, which include one or more GraphQL policies 228. API policies 226 provide features such as security, rate-limiting, transformation, and mediation. GraphQL policies 228 can be made available in an API assembly, allowing API developers to use this policy with the rest of the API policies 226 made available in API gateway 210. By including GraphQL policies 228 in an API assembly, GraphQL API creation is similar to REST APIs, which allows all existing API gateway features to be applied to Graph QL API. Such features include, for example, using Open Authorization (OAuth) access tokens, API key authentication, or Basic authentication. Applying API gateway features to GraphQL API also enables Cross-Origin Resource Sharing (CORS), Mutual Secure Socket Layer (SSL), and other similar security features. GraphQL policies 228 are context driven wherein each step of handling queries such as parsing, validating, extracting query characteristics, etc., is customized dynamically using runtime variables for both input and output.

Once API policies 226 are enforced, GraphQL policies 228 are applied to customize query 222. This customization might include, for example, redacting certain aspects of query 222 before sending it to backend server 240, redacting task results 236 from the backend server 240 before sending them to client 202, injecting security into query 222 based on an authenticated identity or a different identity trusted by the backend server 240, applying API threat protection based on statistics about Graph QL query 222 and results 236, and applying a GraphQL-level rate limit in addition to the API rate limit.

If the API call integration manager 218 determines, for example, that the backend server 240 cannot read or utilize query 222, API call integration manager 218 searches a repository for API call integration patterns 230. This determination might be based on an API discovery process on backend server 240. API call integration patterns 230 are program code for an abstraction of the target API 242 on backend server 240 corresponding to the API and associated data 224 in query 222.

API call integration manager 218 utilizes API policies 226 and API call integration pattern 230 to generate transformed query 232 that includes transformed API call and associated data 234. Transformed query 232, which includes transformed API call and associated data 234, corresponds to query 222, which includes API call and associated data 224. The target API 242 on backend server 240 is able to read and utilize transformed query 232 including transformed API call and associated data 234.

Subsequently, API gateway 210 receives task results 236 from the target API 242. Task results 236 represent a result of the target API 242 performing the service function corresponding to transformed query 232. Task results 236 might simply be a notification that the service function was performed by the target API 242 on the backend server 240. However, task results 236 might include data that needs to be processed by the source API 204 on client 202. In this situation, API call integration manager 218 performs a similar process using API policies 226 and API call integration patterns 230 to transform a call from the target API 242 to a call that the source API 204 can read and utilize.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 3:
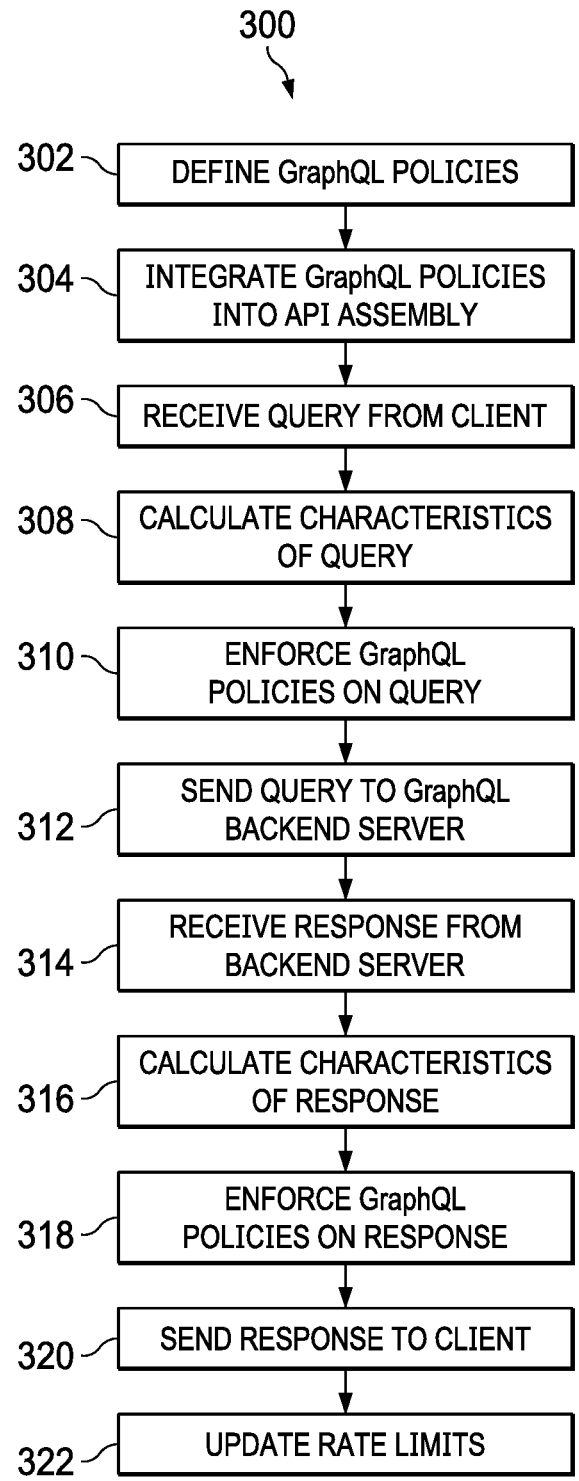
FIG. 3 depicts a flowchart for a process of API management in accordance with illustrative embodiments.

FIG. 3 depicts a flowchart for a process of API management in accordance with illustrative embodiments. Process 300 can be carried out by an API management system such as system 200 shown in FIG. 2. Process 300 begins by defining a number of GraphQL policies (step 302). In an embodiment, the GraphQL policies are dynamic and can be customized to any environment to allow a subset of the schema of the GraphQL backend server to be exposed to a client via an API gateway. In this manner, some aspects of the schema can be hidden from the client but can be used by the API gateway to populate values by modifying the query (explained below).

The GraphQL policies are then integrating into an API assembly for an API, wherein the GraphQL policies number among other API policies at an API gateway (step 304).

The API gateway receives a query from a client device (step 306) and calculates the characteristics of the query (step 308).

The GraphQL policies are enforced on the query at the API gateway in addition to other API policies (step 310), and the query is then sent to a GraphQL backend server (step 312). Enforcing the GraphQL policies might comprise modifying it in some way (described below) or simply logging the query to a number of backend servers. The API gateway might also parse and validate the query against the schema of the GraphQL backend server before sending the query to the GraphQL backend server.

The API gateway receives from the GraphQL backend server a response to the processed query (step 314), and characteristics of the response are calculated (step 316). The GraphQL policies are enforced on the response at the API gateway (step 318) before sending the response to the client (step 320).

Rate limits in the policies can then be updated based on statistics about the GraphQL query and response (step 322).

Figure 4:
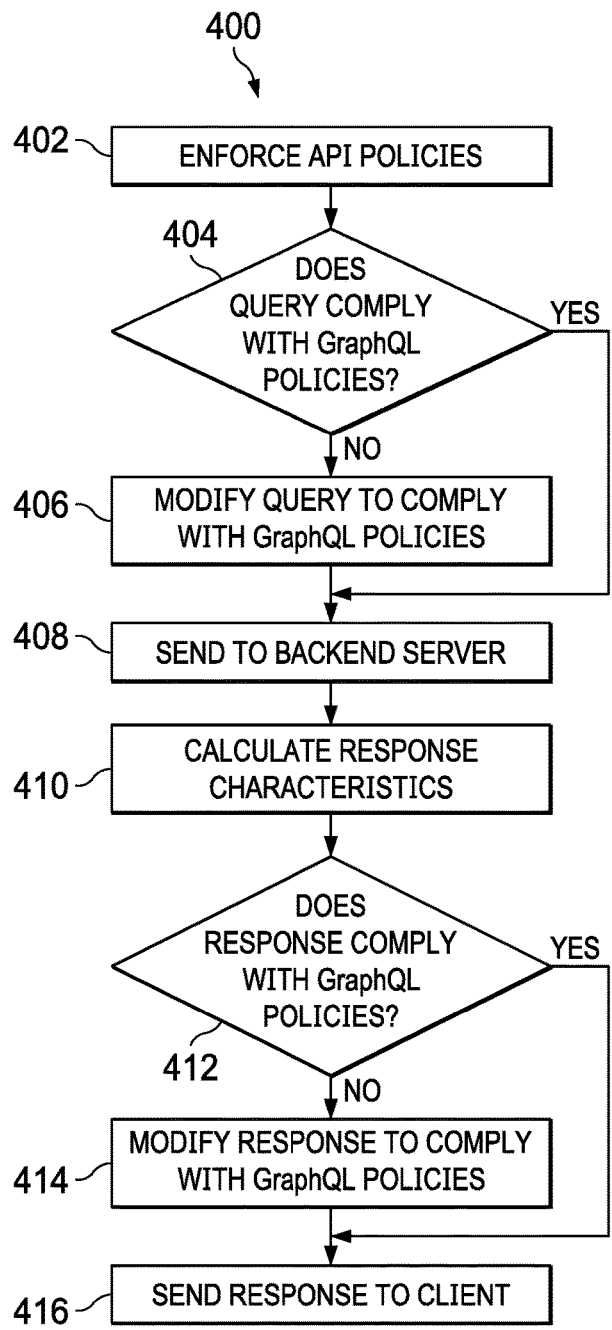
FIG. 4 depicts a flowchart for a process of enforcing GraphQL policies in accordance with illustrative embodiments.

FIG. 4 depicts a flowchart for a process of enforcing GraphQL policies in accordance with illustrative embodiments. Process 400 is an elaboration of processing the query and response to comply with the GraphQL policies in process 300 shown in FIG. 3. Process 400 begins by first applying API level policies to the query (step 402). These policies might include API level security, rate limits, etc. After the API level policies are enforced, the API gateway determines if the query complies with the GraphQL policies (step 404).

If the query complies with the GraphQL policies, it is sent to the backend server (step 408). If the query does not comply with the GraphQL policies it is modified to comply with the GraphQL policies before being sent to the GraphQL backend server (step 406). Modifying the query might comprise redacting the query. For example, the query might ask for information in an employee record including first and last name, suffix, employee ID number, and Social Security Number (SSN). The GraphQL policies might require redaction of the query to remove the request for the SSN. Another example of modifying the query might comprise pre-processing the query, asking a different backend server about a portion of the query, and replacing that portion of the query with information provided by the other backend server.

When the response is received from the GraphQL backend server, the characteristics of the response are calculated (step 410), and the API gateway determines if the response complies with the GraphQL policies (step 412).

If the response complies with the GraphQL policies, it is sent to the client (step 416). If the response does not comply with the GraphQL policies it is modified to comply with the GraphQL policies before being sent to the client (step 414). Modifying might comprise redacting the response. Using the example above, instead of redacting the query to remove the request for the employee SSN, the redaction is performed on the response JavaScript Object Notation (JSON) data to removed the SSN after it is received from the backend server. Modification might also comprise modifying the response to a different data format, e.g., transforming the response to Extensible Markup Language (XML) or to a different form of JSON. Another form of modification might comprise post-processing the response, asking a different backend server about an element of the response, and augmenting the response with information provided by the other backend server.

Different Graph QL policies can be applied to the query and response during their respective modifications.

Figure 5:
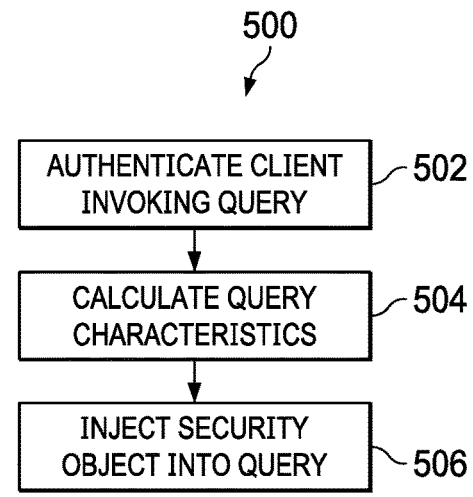
FIG. 5 depicts a flowchart for a process of adding security to a query according to the GraphQL policy in accordance with illustrative embodiments.

FIG. 5 depicts a flowchart for a process of adding security to a query according to the GraphQL policy in accordance with illustrative embodiments. Process 500 is an elaboration of processing the query to comply with the GraphQL policy in process 300 shown in FIG. 3. Process 500 begins by authenticating the user/client invoking the query (step 502). The native API manager support of the API gateway can be employed for authentication. The authentication can be implemented using mechanisms such as Open Authorization (OAuth), API key authentication, Basic authentication, form login, etc. The API gateway can extract the authorization header of the query, validate the token and authenticate the user/client. For API key, the client ID can be sent in a query field, and the API gateway can validate it and replace it with a token that can be understood by the GraphQL backend server.

After authentication of the user/client, the characteristics of the query are calculated (step 504), and a security object is injected into the query before sending the query to the GraphQL backend server based on the authenticated identity or another identity trusted by the GraphQL backend server (step 506). This security object might comprise, for example, a new field/type or a value of an argument as in, e.g., "token:abcd". The token can be, e.g., a JavaScript Object Notation Web Token (JWT) that the API gateway generates and adds to the query parameters to enable security.

Figure 6:
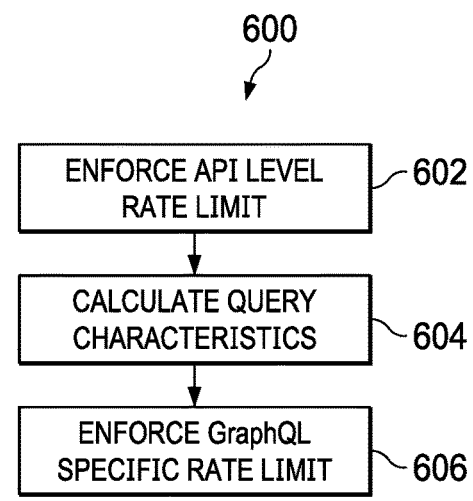
FIG. 6 depicts a flowchart for a process of enforcing a GraphQL level rate limit in accordance with illustrative embodiments.

FIG. 6 depicts a flowchart for a process of enforcing a GraphQL level rate limit in accordance with illustrative embodiments. Process 600 is an elaboration of processing the query to comply with the GraphQL policy in process 300 shown in FIG. 3. Process 600 illustrates how illustrative embodiments allow rate limits to be enforced on queries at two levels, the API level and the GraphQL level. When the query is received by the API gateway, the API level rate limit is enforced on the query (step 602). No matter how small the query is, clients cannot exceed the rate limit set for the API, e.g., 100 queries per second.

After the API level rate limit is enforced, the characteristics of the query are determined (step 604). After the characteristics are calculated, the GraphQL level rate limit is also enforced based on the complexity of the query (step 606).

Figure 7:
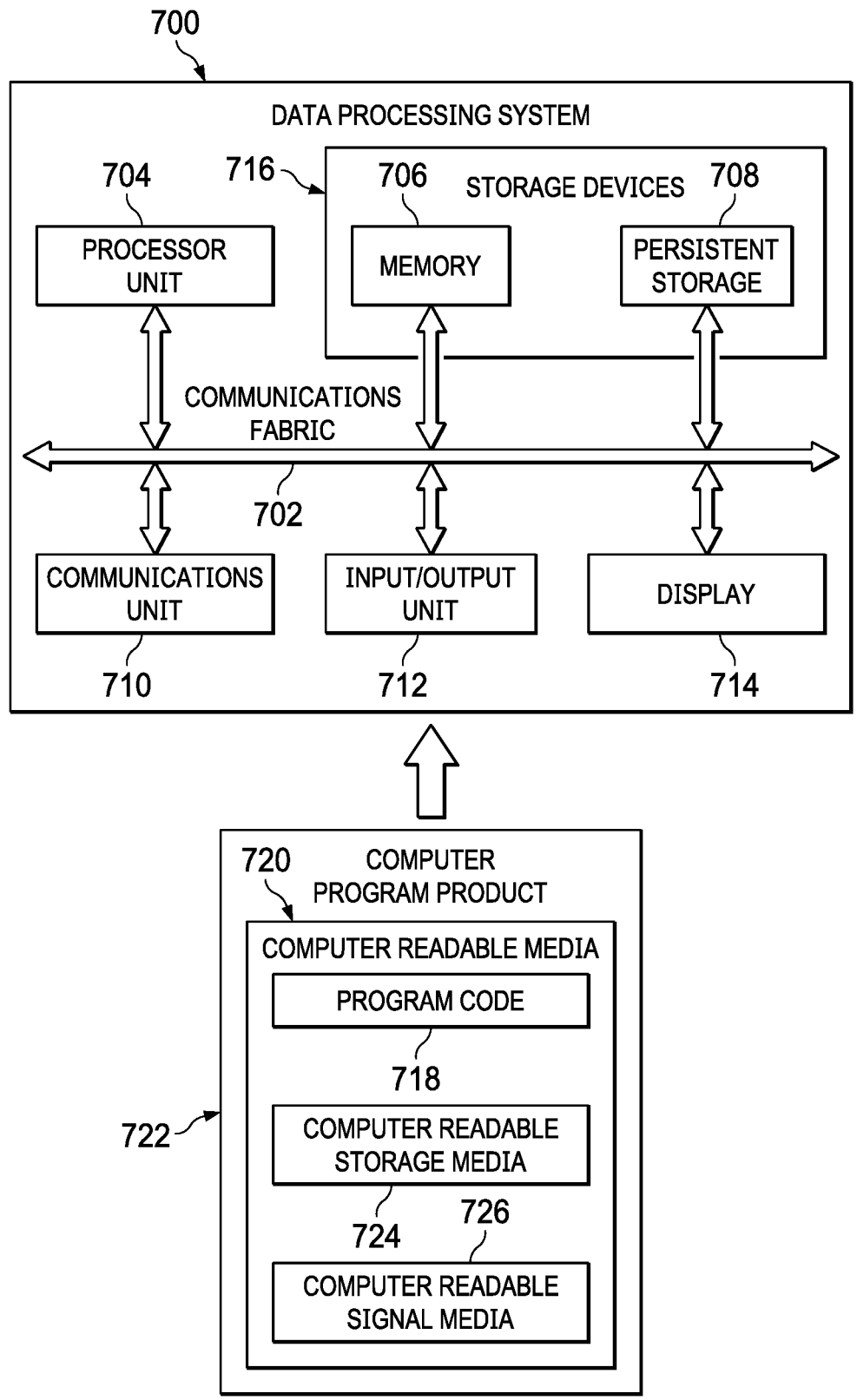
FIG. 7 is a diagram of a data processing system is depicted in accordance with an illustrative embodiment.

Turning to FIG. 7, a diagram of a data processing system is depicted in accordance with an illustrative embodiment. Data processing system 700 is an example of a system in which computer-readable program code or program instructions implementing processes of illustrative embodiments may be run. Data processing system 700 may be an example of one system in which server 104 or client 112 in FIG. 1 can be implemented. In this illustrative example, data processing system 700 includes communications fabric 702, which provides communications between processor unit 704, memory 706, persistent storage 708, communications unit 710, input/output unit 712, and display 714.

Processor unit 704 serves to execute instructions for software applications and programs that may be loaded into memory 706. Processor unit 704 may be a set of one or more hardware processor devices or may be a multi-processor core, depending on the particular implementation. Further, processor unit 704 may be implemented using one or more heterogeneous processor systems, in which a main processor is present with secondary processors on a single chip. As another illustrative example, processor unit 704 may be a symmetric multi-processor system containing multiple processors of the same type.

A computer-readable storage device is any piece of hardware that is capable of storing information, such as, for example, without limitation, data, computer-readable program code in functional form, and/or other suitable information either on a transient basis and/or a persistent basis. Further, a computer-readable storage device excludes a propagation medium. Memory 706, in these examples, may be, for example, a random access memory, or any other suitable volatile or non-volatile storage device. Persistent storage 708 may take various forms, depending on the particular implementation. For example, persistent storage 708 may contain one or more devices. For example, persistent storage 708 may be a hard drive, a flash memory, a rewritable optical disk, a rewritable magnetic tape, or some combination of the above. The media used by persistent storage 708 may be removable. For example, a removable hard drive may be used for persistent storage 708.

Communications unit 710, in this example, provides for communication with other computers, data processing systems, and devices via network. Communications unit 710 may provide communications using both physical and wireless communications links. The physical communications link may utilize, for example, a wire, cable, universal serial bus, or any other physical technology to establish a physical communications link for data processing system 700. The wireless communications link may utilize, for example, shortwave, high frequency, ultra-high frequency, microwave, wireless fidelity (WiFi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 700.

Input/output unit 712 allows for the input and output of data with other devices that may be connected to data processing system 700. For example, input/output unit 712 may provide a connection for user input through a keypad, keyboard, and/or some other suitable input device. Display 714 provides a mechanism to display information to a user and may include touch screen capabilities to allow the user to make on-screen selections through user interfaces or input data, for example.

Instructions for the operating system, applications, and/or programs may be located in storage devices 716, which are in communication with processor unit 704 through communications fabric 702. In this illustrative example, the instructions are in a functional form on persistent storage 708. These instructions may be loaded into memory 706 for running by processor unit 704. The processes of the different embodiments may be performed by processor unit 704 using computer-implemented program instructions, which may be located in a memory, such as memory 706. These program instructions are referred to as program code, computer-usable program code, or computer-readable program code that may be read and run by a processor in processor unit 704. The program code, in the different embodiments, may be embodied on different physical computer-readable storage devices, such as memory 706 or persistent storage 708.

Program code 718 is located in a functional form on computer-readable media 720 that is selectively removable and may be loaded onto or transferred to data processing system 700 for running by processor unit 704. Program code 718 and computer-readable media 720 form computer program product 722. In one example, computer-readable media 720 may be computer-readable storage media 724 or computer-readable signal media 726. Computer-readable storage media 724 may include, for example, an optical or magnetic disc that is inserted or placed into a drive or other device that is part of persistent storage 708 for transfer onto a storage device, such as a hard drive, that is part of persistent storage 708. Computer-readable storage media 724 also may take the form of a persistent storage, such as a hard drive, a thumb drive, or a flash memory that is connected to data processing system 700. In some instances, computer-readable storage media 724 may not be removable from data processing system 700.

Alternatively, program code 718 may be transferred to data processing system 700 using computer-readable signal media 726. Computer-readable signal media 726 may be, for example, a propagated data signal containing program code 718. For example, computer-readable signal media 726 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 718 may be downloaded over a network to persistent storage 708 from another device or data processing system through computer-readable signal media 726 for use within data processing system 700. For instance, program code stored in a computer-readable storage media in a data processing system may be downloaded over a network from the data processing system to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to, or in place of, those illustrated for data processing system 700. Other components shown in FIG. 7 can be varied from the illustrative examples shown. The different embodiments may be implemented using any hardware device or system capable of executing program code. As one example, data processing system 700 may include organic components integrated with inorganic components and/or may be comprised entirely of organic components excluding a human being. For example, a storage device may be comprised of an organic semiconductor.

As another example, a computer-readable storage device in data processing system 700 is any hardware apparatus that may store data. Memory 706, persistent storage 708, and computer-readable storage media 724 are examples of physical storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 706 or a cache such as found in an interface and memory controller hub that may be present in communications fabric 702.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Furthermore, it should be understood that embodiments discussed herein are not limited to the particular features and processing steps shown. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of application programming interface (API) management, the method comprising:
defining, by a number of processors, a number of GraphQL policies;
integrating, by the number of processors, the GraphQL policies into an API assembly, wherein the GraphQL policies number among other API policies at an API gateway;
receiving, by the number of processors, a query from a client, wherein the query is formatted according to a source API associated with the client;
enforcing, by the number of processors, the GraphQL policies on the query at the API gateway and modifying the query if it does not comply with the GraphQL policies;
transforming the query into a format according to a target API associated with a GraphQL backend server to generate a transformed query;
sending, by the number of processors, the transformed query to the GraphQL backend server;
receiving, by the number of processors, from the GraphQL backend server a response to the transformed query;
enforcing, by the number of processors, the GraphQL policies on the response at the API gateway and modifying the response if it does not comply with the GraphQL policies; and
sending, by the number of processors, the response to the client.

2. The method of claim 1, further comprising:
determining, by the number of processors, characteristics of the query; and
extracting, by the number of processors, characteristics of the response.

3. The method of claim 1, wherein enforcing the GraphQL policies on the query comprises at least one of:
enforcing a GraphQL rate limit on the query;
logging the query to a number of backend servers;
redacting a portion of the query; or
pre-processing the query and replacing a portion of the query with information provided by a second backend server.

4. The method of claim 1, wherein enforcing the GraphQL policies on the response comprises at least one of:
redacting a portion of the response;
modifying the response to a different data format; or
post-processing the response and augmenting the response with information provided by a second back-end server.

5. The method of claim 1, wherein the API gateway parses and validates the query against a schema before sending the query to the GraphQL backend server.

6. The method of claim 1, further comprising:
authenticating an identity of the client; and
upon authentication, injecting a security object into the query before sending the query to the GraphQL backend server.

7. The method of claim 1, wherein a subset of a schema of the GraphQL backend server is exposed to the client via the API gateway.

8. The method of claim 1, further comprising updating rate limits.

9. A computer program product for application programming interface (API) management, the computer program product comprising:
a non-volatile computer readable storage medium having program instructions embodied therewith, the program instructions executable by a number of processors to cause the computer to perform the steps of:
defining a number of GraphQL policies;
integrating the GraphQL policies into an API assembly, wherein the GraphQL policies number among other API policies at an API gateway;
receiving a query from a client, wherein the query is formatted according to a source API associated with the client;
enforcing the GraphQL policies on the query at the API gateway and modifying the query if it does not comply with the GraphQL policies;
transforming the query into a format according to a target API associated with a GraphQL backend server to generate a transformed query;
sending the transformed query to the GraphQL backend server;
receiving from the GraphQL backend server a response to the transformed query;
enforcing the GraphQL policies on the response at the API gateway and modifying the response if it does not comply with the GraphQL policies; and
sending the response to the client.

10. The computer program product of claim 9, further comprising instructions for
determining characteristics of the query; and
extracting characteristics of the response.

11. The computer program product of claim 9, wherein enforcing the GraphQL policies on the query comprises instructions for at least one of:
enforcing a GraphQL rate limit on the query;
logging the query to a number of backend servers;
redacting a portion of the query; or
pre-processing the query and replacing a portion of the query with information provided by a second backend server.

12. The computer program product of claim 9, wherein enforcing the GraphQL policies on the response comprises instructions for at least one of:
redacting a portion of the response;
modifying the response to a different data format; or
post-processing the response and augmenting the response with information provided by a second back-end server.

13. The computer program product of claim 9, wherein the API gateway parses and validates the query against a schema before sending the query to the GraphQL backend server.

14. The computer program product of claim 9, further comprising instructions for:
authenticating an identity of the client; and
upon authentication, injecting a security object into the query before sending the query to the GraphQL backend server.

15. The computer program product of claim 9, wherein a subset of a schema of the GraphQL backend server is exposed to the client via the API gateway.

16. The computer program product of claim 9, further comprising instructions for updating rate limits.

17. A system for textual masking for application programming interface (API) management, the system comprising:
   a bus system;
   a storage device connected to the bus system, wherein the storage device stores program instructions; and
   a number of processors connected to the bus system, wherein the number of processors execute the program instructions to:
   define a number of GraphQL policies;
   integrate the GraphQL policies into an API assembly, wherein the GraphQL policies number among other API policies at an API gateway;
   receive a query from a client, wherein the query is formatted according to a source API associated with the client;
   transform the query into a format according to a target API associated with a GraphQL backend server to generate a transformed query;
   enforce the GraphQL policies on the query at the API gateway and modifying the query if it does not comply with the GraphQL policies;
   send the transformed query to the GraphQL backend server;
   receive from the GraphQL backend server a response to the transformed query;
   enforce the GraphQL policies on the response at the API gateway and modifying the response if it does not comply with the GraphQL policies; and
   send the response to the client.

18. The system of claim 17, wherein to enforce the GraphQL policies on the query the number of processors execute instructions to do at least one of:
   enforce a GraphQL rate limit on the query;
   log the query to a number of backend servers
   redact a portion of the query; or
   pre-process the query and replace a portion of the query with information provided by a second backend server.

19. The system of claim 17, wherein to enforce the GraphQL policies on the response the number of processors execute instructions to do at least one of:
   redact a portion of the response;
   modify the response to a different data format; or
   post-process the response and augment the response with information provided by a second backend server.

20. The system of claim 17, wherein the number of processors further execute instructions to:
   authenticate an identity of the client; and
   upon authentication, inject a security object into the query before sending the query to the GraphQL backend server.

* * * * *